(No Model.) 2 Sheets—Sheet 1.

C. S. BRADLEY.
THERMO ELECTRIC GENERATOR.

No. 420,764. Patented Feb. 4, 1890.

Witnesses:
S. Field.
J. C. Sparth

Charles S. Bradley,
Inventor.
McTighe & Worthington
Attorneys.

(No Model.) 2 Sheets—Sheet 2.
C. S. BRADLEY.
THERMO ELECTRIC GENERATOR.
No. 420,764. Patented Feb. 4, 1890.
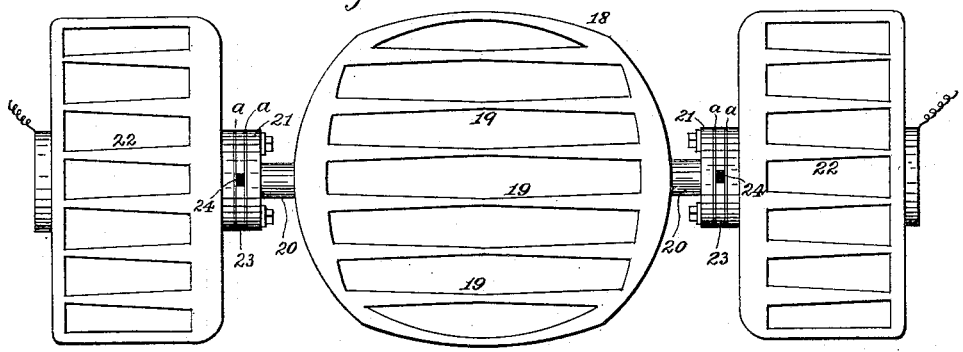
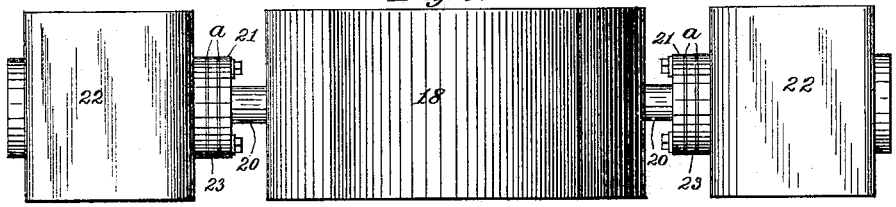
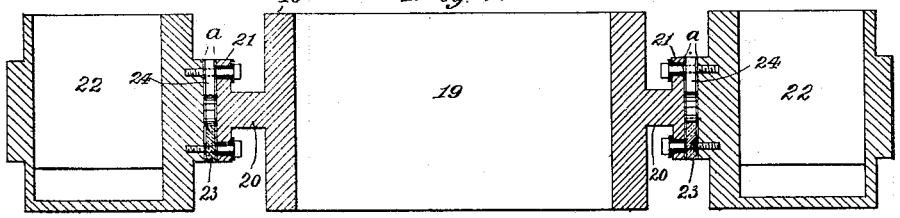
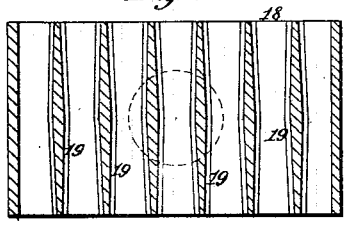 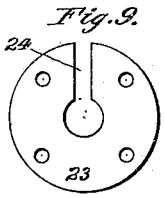 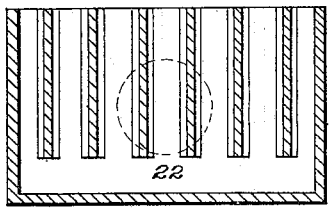
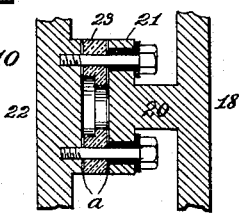
Witnesses:
S. Field.
J. C. Spaeth
Charles S. Bradley,
Inventor.
M. Tighe & Worthington
Attorneys.

UNITED STATES PATENT OFFICE.

CHARLES S. BRADLEY, OF YONKERS, NEW YORK.

THERMO-ELECTRIC GENERATOR.

SPECIFICATION forming part of Letters Patent No. 420,764, dated February 4, 1890.

Application filed June 17, 1889. Serial No. 314,680. (No model.)

*To all whom it may concern:*

Be it known that I, CHARLES S. BRADLEY, a citizen of the United States, residing at Yonkers, in the county of Westchester and State of New York, have invented certain new and useful Improvements in Thermo-Electric Generators; and I do hereby declare the following to be a full, clear, and exact description of the invention, such as will enable others skilled in the art to which it appertains to make and use the same.

This invention relates to the construction of thermo-electric generators, and has for its object certain improvements in the form of the generator, affecting its cost and efficiency and mechanical strength.

Heretofore thermo-electric pairs and batteries have been constructed of metals or alloys which remain in the solid state while in operation. It has been found that the electro-motive force is higher at a given difference of temperature between the hot and cold junctions in the case of certain alloys than where simple metals are used for each member of the thermo-electric couple. It has been found, however, that the alloys which have proved the most efficient with respect to the generation of electrical energy are mechanically weak, and are liable not only to become cracked from slight causes, but even to become broken. The consequence is that batteries and generators constructed of these fragile alloys must be handled with extreme care in order to have them preserve their effectiveness and must be operated at comparatively low temperatures.

My invention therefore consists in certain arrangements and combinations involving the use of a metal or alloy at the thermo-electric junctions, and so disposed that the metal or alloy may be fused without injuring, substantially as hereinafter fully described and claimed.

Figure 1:
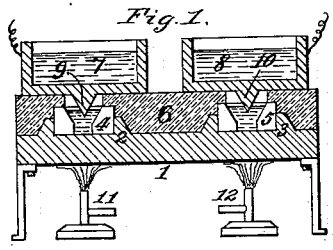
Figure 2:
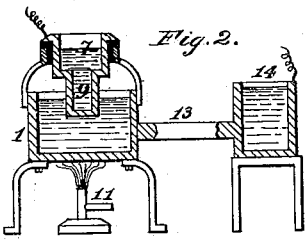
Figure 3:
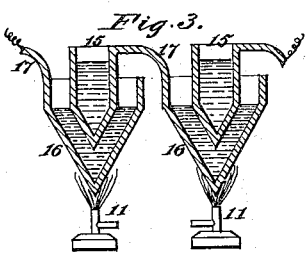
Figure 11:
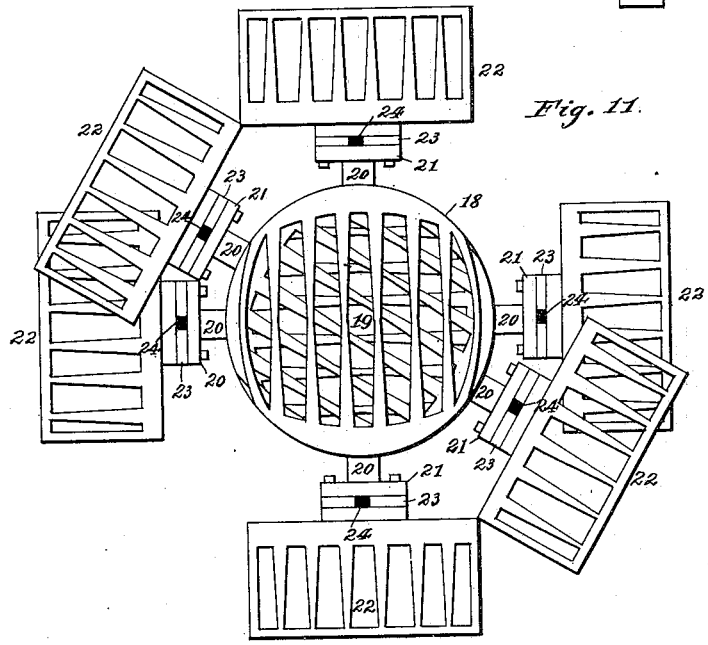
Figure 12:
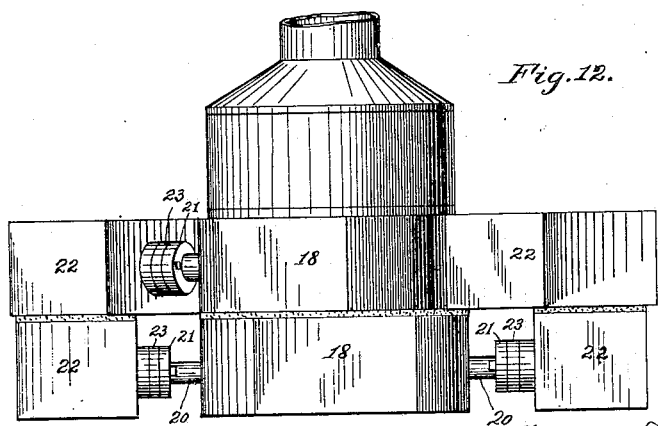

In the drawings which form part of this specification, Figure 1 is a diagram of one of the simplest forms of my invention. Fig. 2 is a sectional diagram illustrating the invention in another form. Fig. 3 is still another modification of the mere form. Figs. 4, 5, and 6 are respectively plan and side elevations and a longitudinal section of the complete and developed type of thermo-electric generator which I have devised in accordance with the present invention. Fig. 7 is a transverse vertical section of what I may term the "heater." Fig. 8 is a similar section of what I term the "cooler." Fig. 9 is a face view of the non-conducting washer which forms the fusion-cell of the apparatus. Fig. 10 is an enlarged section showing a modified form of fusion-cell. Fig. 11 is a plan view of a series of such generators placed one above the other, and Fig. 12 is a side elevation illustrating the same in connection with a furnace structure.

In Fig. 1 I construct a plate of iron 1, with annular projections 2 and 3, which form pockets for the reception of small fire-clay rings 4 5, and I lay on the plate 1 a moderately thick layer of a non-conductor of electricity—such, for example, as asbestus 6—which is also a poor thermal conductor. Above these I place the coolers 7 8, respectively, each preferably being constructed of iron in the form of a vessel adapted to contain water, and each having on its under face a nipple or projection 9 10, respectively, dipping into the cavity formed by the clay rings 4 5. Into the cell formed by the ring 4, I pour the molten alloy which it is desired to use, and into the cell formed by the ring 5, I pour molten bismuth or other metal. Underneath the plate 1, I introduce a suitable source of heat—such, for instance, as the gas-burners 11 12. The thermo-electric generator thus constructed has for its terminals the cast-iron coolers 7 8, and these can be connected into the circuit in any desired way.

In the modification shown at Fig. 2 the cooler 7 has its nipple 9 hollow and forming a part of the water-chamber of the cooler. The heater 1 is directly formed into a cup shape, containing the alloy, and the heat source 11 is applied directly to the bottom of such vessel. From the side of the cup 1 extends an iron rod 13, which terminates in a cup 14, carrying water, so as to keep the terminal cool belonging to the alloy element.

In Fig. 3 the devices are arranged to be nested, and the construction is that of a double structure composed of the upper iron cup 15 and the lower iron cup 16, united by the bracket 17. A pair of these may be used together, the cup 15 of one fitting down into the cup 16 of the other, and the space in cup 16 between it and the interior cup 15 of the adjoining element being made the receptacle of the fused alloy. The heat source 11 is applied to each of the cups 16 and water is placed in the interior cups 15.

Although the foregoing forms are representative of the principles of my invention, I prefer the form fully shown in Figs. 4 to 12, inclusive, as being more especially adapted to practical work. This construction is as follows:

I take a central heater consisting of the inclosure 18, which may be of any suitable form, and has crossing it in the interior a number of heating-surfaces 19, which I prefer to make thinnest at the center and gradually thickening up at the opposite ends, and toward such ends the walls of the heater 18 also grow thicker for the purpose of affording conductibility proportionate to the amount of heat that has to be conducted as the point of concentration is approached. This point of concentration is found at the projections 20, which end in the flanges 21. The whole structure 18, 19, 20, and 21 is made of ordinary cast-iron and is arranged with any suitable source of heat below it—such as one or more gas-burners or a furnace of suitable character. To each of the flanges 21, I bolt the coolers 22, (the bolts being insulated, as shown,) which I prefer to make of cast-iron, with internal cooling-surfaces, gradually diminishing in cross-section as they recede from the point of attachment to flange 21. Between the flange 21 and the cooler 22, I place an annular washer or packing 23 of such material as is not a conductor of electricity, and preferably also a poor conductor of heat. One side of this packing is cut through, so as to form a slot communicating from the exterior to the interior of the washer, and when the heater is bolted up into the position, as shown in the various figures, the opening at the center of the washer 23 forms a flat circular cavity or cell, with which communication can be had from the outside by means of the slot or opening 24. Into one of the cavities thus formed—for instance, that at the left—I pour melted alloy of cadmium and antimony, and into the other—namely, the one at the right—I pour melted bismuth. Upon the application of a sufficient amount of heat from some external source to the heater 18, 19, and 20 the apparatus becomes a thermo-electric generator, of which the hot junction may be said to be composed of the molten bismuth and the alloy of cadmium and antimony, the mass of iron 18 19 20, which lies between these two bodies, being practically inert and serving merely the purpose of conveying the heat to the hot junction. At the same time, however, the said mass of iron is also a portion of the electric circuit; but on account of its form and proportions its conductivity is so great electrically as to become practically an immaterial factor in the resistance of the entire circuit. The same may be said of the cooler 22.

The resistance of the active portion of the generator will be exceedingly small, since it is due merely to the thickness of the body of melted metal or alloy in the thermo-electric cells already described, and as the cross-sectional area of these will be very large, comparatively, the linear resistance to the flow of electric current will be very low. As a matter of fact, it may be well to state that a cell so formed, one inch in diameter and one-eighth inch long, containing the above-mentioned alloy, will have an electrical resistance of less than .0001 of an ohm, and in the pair above mentioned the electro-motive force will be about .073 volt. Consequently, if the external resistance be kept low enough, the volume of current may be allowed to reach very large proportions in the generator itself without the possibility of doing any harm.

It will be observed that the molten condition of the metal or alloy in the fusion-cell permits a very high temperature to be reached at the hot junction and a very low temperature at the cold junction; yet the active portion of the circuit is exceedingly short. With a proper amount of cooling-surface in the coolers 22 and the application of water as a means of carrying off the heat it is possible to maintain the surface of the metal in the fusion-cell in a solid state along the surface which is in contact with the cooler 22; and, being thus able to maintain a high temperature at the hot junction and a low temperature at the cold junction, I can obtain a very high efficiency in the generator as a whole. In the modification shown at Figs. 9 and 10 by special construction of the cell-forming washer 23, I am enabled to widen out or expand the actual surface of the cold junction without materially altering the other conditions above noted, or in any way detracting from the advantages belonging to the principle.

Another advantage of the foregoing construction is the small quantity of working metals which are required, thus insuring the small first cost, short electric circuit, and minimum internal resistance. By far the largest portion of the entire structure is made of inactive material—such, for instance, as cast-iron—which not only serves to gather and deliver the heat, but also forms the electrical connections and the retaining walls for the fused metals, and by the use of cast-iron for the foregoing purposes I can safely use a very high initial temperature, and thereby attain a maximum efficiency, such as is impossible in such structures as require the direct contact of the two thermo-electric bodies at the hot junction, since in the latter case a limitation is placed by the melting-point of the material, which thus forms a portion of the mechanical structure of the generator.

I do not herein limit the scope of this invention to any particular metals or alloys to be used in the fusion-cell of a thermo-electric generator, as a great variety of metals and alloys are now well known and can be used to good effect in accordance with the invention hereinbefore described.

It is desirable to use a thin insulating annular washer $a$ on each side of the cell-forming washer 23, to prevent interference of action by the neck of alloy or metal rising from the fusion-cell, which may at that point sometimes solidify. The washers $a$, however, prevent contact of this neck with the iron faces of the heater and cooler.

I claim as my invention—

1. A thermo-electric generator having an element which remains solid at the highest working temperature, in combination with an element which becomes fused at the hot junction.

2. A thermo-electric generator having an element which remains solid at the highest working temperature, in combination with an element which is fused at the hot junction and solid at the cold junction.

3. A thermo-electric generator having two fusible elements in contact with an interposed electrically-conductive heater adapted to fuse said elements at the surfaces of contact therewith.

4. A thermo-electric generator having a fusible element in contact with a practically infusible electrically-conductive heater.

5. A thermo-electric generator having a fusible element in contact at one end with a practically infusible electrically-conductive heater and at the other end with an electrically-conductive cooler.

6. A thermo-electric generator comprising a fusion-cell containing a fusible metal or alloy and constituted by two adjacent conductive bodies insulated from each other, and a source of heat applied to one of said bodies.

7. A thermo-electric generator comprising a fusion-cell containing a fusible metal or alloy and constituted by two adjacent conductive bodies with an interposed insulating ring or annulus, and a source of heat applied to one of said bodies of metal.

8. A thermo-electric generator having a fused element in the form substantially of a disk axially presented to the electrical circuit.

9. A thermo-electric generator having an element of fusible metal or alloy of disk or plate form, in combination with heating and cooling devices, respectively, applied to the faces of the disk.

10. A thermo-electric generator comprising two fusible elements and an interposed metallic heater adapted to receive heat and distribute it to the fusible elements.

11. A thermo-electric generator comprising two thermo-electric elements joined by an interposed metallic element expanded into a heating-chamber.

In testimony whereof I affix my signature in presence of two witnesses.

CHARLES S. BRADLEY.

Witnesses:
VICTOR E. BURKE,
GEO. WORTHINGTON.